US007058269B2

(12) United States Patent
Caron

(10) Patent No.: US 7,058,269 B2
(45) Date of Patent: Jun. 6, 2006

(54) RECONSTRUCTED GLASS FOR FIBER OPTIC APPLICATIONS

(75) Inventor: Serge Caron, Saint-Augustin-de-Desmaures (CA)

(73) Assignee: Institut National D'Optique, Quebec (CA)

( * ) Notice: Subject to any disclaimer, the term of this patent is extended or adjusted under 35 U.S.C. 154(b) by 522 days.

(21) Appl. No.: 10/041,529

(22) Filed: Oct. 24, 2001

(65) Prior Publication Data

US 2003/0077056 A1    Apr. 24, 2003

(51) Int. Cl.
G02B 6/02        (2006.01)
C03B 37/12      (2006.01)

(52) U.S. Cl. .................. 385/123; 385/142; 385/140; 65/399

(58) Field of Classification Search ............... 385/123, 385/124, 127, 141, 142, 144, 140, 139; 65/399, 65/427–429, 472; 428/542.8, 364, 396
See application file for complete search history.

(56) References Cited

U.S. PATENT DOCUMENTS

| | | | |
|---|---|---|---|
| 2,106,744 A | 2/1938 | Hood | |
| 2,505,001 A | 4/1950 | Nordberg | 49/79 |
| 2,982,053 A | 5/1961 | Elmer | 49/79 |
| 3,938,974 A * | 2/1976 | Macedo et al. | 65/399 |
| 4,110,093 A | 8/1978 | Macedo et al. | 65/3 R |
| 4,116,653 A | 9/1978 | Irven | 65/2 |
| 4,319,905 A | 3/1982 | Macedo et al. | 65/31 |
| 4,345,036 A * | 8/1982 | Bamford et al. | 501/37 |
| 4,410,345 A * | 10/1983 | Usui et al. | 65/399 |
| 4,525,189 A * | 6/1985 | Ohmi et al. | 65/399 |
| 4,812,153 A * | 3/1989 | Andrejco et al. | 65/415 |
| 4,902,426 A * | 2/1990 | Macedo et al. | 210/656 |
| 4,923,279 A * | 5/1990 | Ainslie et al. | 385/127 |
| 5,047,076 A * | 9/1991 | Cognolato et al. | 65/418 |
| 5,151,117 A * | 9/1992 | Bartholomew et al. | 65/399 |
| 5,262,365 A * | 11/1993 | Oyobe et al. | 501/54 |
| 5,474,588 A * | 12/1995 | Tanaka et al. | 65/390 |
| 6,751,387 B1 * | 6/2004 | Caron et al. | 385/123 |

FOREIGN PATENT DOCUMENTS

| | | |
|---|---|---|
| GB | 1473779 | 5/1977 |
| IT | 1204895 | 3/1989 |

OTHER PUBLICATIONS

"Optical Properties Of Waveguides Made By a Porous Glass Process", by Joseph H. Simmons, Robert K. Mohr, Danh C. Tran, Pedro B. Macedo and Theodore A. Litovitz, Applied Optics, vol. 18, No. 16, Aug. 15, 1979, pp. 2732-2733.

(Continued)

*Primary Examiner*—John D. Lee
*Assistant Examiner*—Mike Stahl
(74) *Attorney, Agent, or Firm*—Merchant & Gould P.C.

(57) ABSTRACT

The present invention concerns a preform for an optical fiber, an optical fiber so obtained and methods for making the same. The fiber is characterized in that porous glass doped with at least one dopant is used. Resulting fibers can be used to make high attenuation fibers.

18 Claims, 3 Drawing Sheets

OTHER PUBLICATIONS

"Novel Dewatering Process For Porous Glass", by Thomas H. Elmer, Corning Glass Works, Corning, NY,14830, American Ceramic Society Bulletin, vol. 59, No. 5 (1980).

"Sintering Of Porous Glass", by Thomas H. Elmer, Corning Glass Works, Corning, NY, 14831, American Ceramic Society Bulletin, vol. 62, No. 4 (1983).

"Porous and Reconstructed Glasses", by Thomas H. Elmer, Corning, Incorporated (Retired), pp. 427-432.

"Molecular Stuffing Of Phasil Glasses For Graded Index Optical Fibers", by P. B. Macedo, J. H. Simmons, T. Olson, R. K. Mohr, M. Samanta, P. K. Gupta and T. A. Litovitz, Vitreous State Laboratory, The Catholic University, Washington, D.C. 20064, USA, "Materials and Technologies" (Part 1), in Proc. ECOC (1976).

Patent Abstracts of Japan, vol. 005, No. 180 (C-079), Nov. 19, 1981 & JP 56 104731 A (Sumitomo Electric Ind Ltd), Aug. 20, 1981 abstract.

DATABASE WP1, Section Ch. Week 44, Derwent Publications Ltd., London, GB; Class L01, AN 1985-273674 XP002236605 & JP 60 186424 A (Hoya Corp) Sep. 21, 1985 abstract.

DATABASE WP1, Section Ch. Week 25, Derwent Publications Ltd., London, GB; Class L01, AN 1982-94073e XP 002236606 & JP 57 156337 A (NT&T Corp) Sep. 27, 1982 abstract.

* cited by examiner

RECONSTRUCTED GLASS FOR FIBER OPTIC APPLICATIONS

FIELD OF THE INVENTION

The present invention relates to reconstructed glass for fibre optic applications, and more particularly for such glass to be used for high attenuation optical fibres.

DESCRIPTION OF THE PRIOR ART

A standard optical fibre (1), shown in FIG. 1, is an optical waveguide made from silica. This waveguide is typically cylinder having an outside diameter b of 125 µm. The core (3) of the fibre has an index of refraction $n_1$ which is greater than the index of refraction of the cladding (2) $n_2$. The greater index of refraction in the core of the fibre causes total internal reflection of the light at the core-cladding interface, thereby permitting guided transmission of the light within the core.

Other than the physical dimensions, the characteristics of an optical fibre are its numerical aperture (NA), related to the indexes of refraction of the core and the cladding, and which is also related to the sinus of the maximum solid angle within which the light is guided in the fibre; and the optical losses which take into account the attenuation of the light along its travel in the fibre. These losses are due to the diffusion of the light and to its absorption by chemical impurities in the fibre.

The search for a very pure fibre, having losses close to the theoretical limit of 0.2 dB/km, lead to the development of chemical vapor deposition (CVD), approximately thirty years ago. A variety of different approaches for CVD have been proposed, notably MCVD, or modified chemical vapor deposition. This technique consists in burning inside an ultra pure silica tube, vapors of $SiCl_4$ in the presence of oxygen. The product of combustion is a soot (fumed silica) which, once heated close to the point of fusion of the silica, transforms itself into homogeneous glass: this is the process of vitrification. By adding predetermined quantities of other compounds during the combustion of the $SiCl_4$, such as $GeCl_4$, $SiF_4$ or $BBr_3$, the index of refraction of the glass can be controlled. The product after vitrification is a silica tube having inside it one or more superposed layers of glass each having an index of refraction and which will form, after collapsing the tube at a high temperature, an optical fibre preform. Drawing of this preform will produce the optical fibre.

It is also known that a non-volatile compound, i.e. one which cannot be burned in vapor phase, can be incorporated into the glass by impregnating the soot with a solution of this compound, before glass vitrification. For example, such a compound, known as a dopant, can be an erbium salt for making optical fibres which amplify light at a wavelength of 1.55 µm. Alternatively, the dopant can be cobalt salt, which will attenuate the light at the same wavelength.

An alternative to CVD was proposed in U.S. Pat. No. 3,938,974 entitled "Method of producing optical wave guide fibers." In essence, the method consists in the impregnation of a micro-porous glass with a solution containing compounds destined to change the index of refraction of the glass, following by a drying out and vitrification of the glass. This method never really became commonplace in the field as the optical losses are relatively high (minimal losses are in the order to 10 dB/km), and the preforms so obtained are generally smaller than those obtained by CVD, and particularly those obtained by OVD (outside vapor deposition) and VAD (vapor axial deposition). The quantity of fibres produced by the porous glass method is thus lower.

SUMMARY OF THE INVENTION

It is an object of the present invention to provide a preform for an optical fibre, an optical fibre and a method of making the same, using porous glass that is doped with at least one dopant, in order to make high attenuation fibres.

In accordance with the invention, these and other objects are achieved with a preform for an optical fibre comprising a core and a cladding, where said core is obtained from a vitrified rod of porous glass doped with at least one dopant for absorbing light.

The invention also concerns an optical fibre comprising a core and a cladding, where said core is obtained from a vitrified rod of porous glass doped with at least one dopant for absorbing light.

The invention further concerns a method for making a preform for an optical fibre comprising the steps of:
  (a) providing a rod of porous glass;
  (b) doping said porous glass with at least one light-absorbing dopant;
  (c) vitrifying said porous glass; and
  (d) collapsing a tube of glass about said vitrified porous glass.

The invention also concerns a method for making a preform for an optical fibre, comprising the steps of:
  (a) providing a tube of borosilicate;
  (b) chemically attacking said tube with a solution to render the silica porous;
  (c) doping the resulting porous glass with at least one dopant;
  (d) vitrifying said porous glass; and
  (e) collapsing a tube of glass about said vitrified porous glass.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
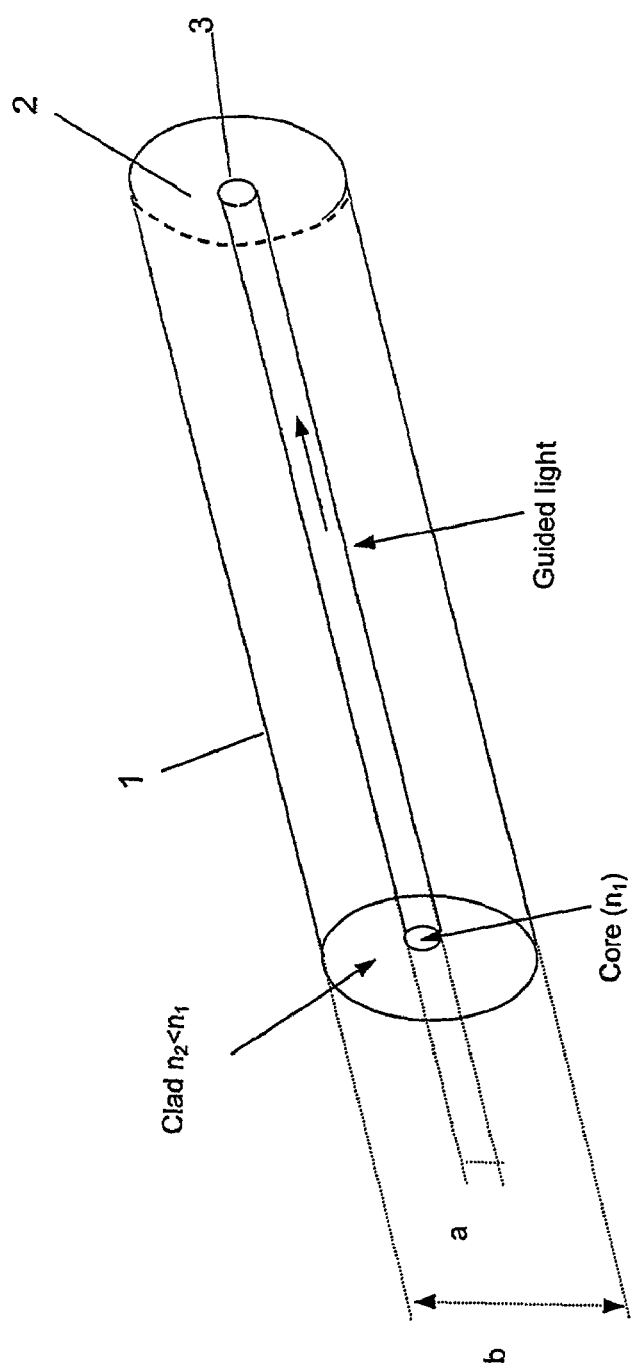
FIG. 1 is a schematic representation of an optical fibre according to a preferred embodiment of the present invention.

It is important at this point to define what is meant by "porous glass", or "controlled pore glasses (CPG)" in the context of the present invention. The expression "porous glass" refers to a class of materials that contain a plurality of interconnected holes called micro-pores, whose dimensions are in the order of a few nanometers. These glasses should be called micro-porous, but throughout the literature, they are referred to as porous glasses.

This definition is important, since the soot produced by CVD is also designated as being porous, which can lead to confusion. In this last case, one should talk about permeable soot, or macro-porous soot. The size of the interstices is much larger, and the soot does not contain interconnected micro-pores; consequently the surface and adsorption properties are quite different from those of micro-porous glass. Another difference between porous glass and porous soot is that the latter is a friable material, whereas the former is a solid material.

In the context of the present invention, the expression porous glass will designate only glasses containing a plurality of interconnected micro-pores obtained by phase separation. The other bases of permeable silica susceptible to be doped will be referred to as soot.

For the manufacture of optical fibres, one disadvantage of porous glasses is that it may contain up to 4% weight of $B_2O_3$. As mentioned previously, this compound decreases the index of refraction of the glass, which means that a greater quantity of dopant must be used to increase the index of refraction beyond that of pure silica.

Notwithstanding this disadvantage, it has been discovered that optical fibres obtained by doping porous glass present unique and unexpected advantages, particularly for the fabrication of high attenuation fibres (hereinafter "HAF"), and more precisely for multi-mode HAF.

HAF fibres contain in their cores dopants, usually transition metal oxides, which absorb the light travelling in the fibres. These types of fibres are used in telecommunications networks to attenuate signals that are too powerful, or act as a end-of-line terminator.

When HAF fibres are fabricated using porous glass, the losses due to absorption by the impurities in the glass, which are greater than 10 dB/km and which are inherent to the technique, are in fact helpful, since the goal is to produce a fibre with high attenuation, or great losses. Consequently, the possibility of working with less expensive (low purity) products is a first advantage. Furthermore, according to the method of the present invention, many preforms can be doped together in large industrial containers. The chemicals used are little if not at all toxic, which means that the safety measures to be taken by the staff are minimal. Finally, the process of the present invention requires a less skilled workforce, which lowers the production cost.

Also, in comparison with MCVD, the porous glass technique also presents advantages with respect to solution doping, particularly for the fabrication of multimode HAF fibres. On one hand, the porosity is much more homogeneous than that of soot produced by MCVD, in both the axial and radial directions. In fact, by MCVD, it is often than the porosity of the soot varies considerably along the length of the preform. Consequently, once the soot has been impregnated with coloring ions, the concentration of this dopant varies with the length of the fibre obtained by MCVD.

The concentration of dopant according to the process of the present invention is also more radially homogeneous, since in MCVD, the successive deposits of soot that have to be made in order to obtain a sufficiently large core leave a radial trace which is reflected in the concentration of the dopant, but this is not the case for good quality porous glass.

It is also worthy of note that the porosity of porous glass is sufficiently reproducible from one glass to another (which is why porous glass is sometimes referred to as controlled porous glass). Such control is not possible with soot, since the combustion procedure permitting their reproduction is too violent and chaotic.

In contrast with MCVD, it has been found that particularly advantageous characteristics of doping porous glass are present for multimode optical fibres. With MCVD, one must depose many layers of soot, i.e. many tens of layers, to obtain multimode fibres. In this case, the outside layers are friable and have a tendency of breaking off during the impregnation by a solution. One way to obviate this problem has been to depose two or three layers of soot, and then etch the external tube of silica to increase the core/cladding ratio in order to obtain a multimode fibre. This method has the disadvantage of not producing many fibres, given the fact that a lot of material is removed.

Another advantage of the technique of the present invention is that it has been observed that it is possible to considerably increase the concentration of the dopant with respect to the MCVD technique. This can most likely be explained by the fact that vitrification occurs more easily using porous glass than with MCVD. In fact, the vitrification (or consolidation, or sintering) of porous glass can happen at temperatures as low as 1000° C., whereas vitrification of the soot in the mCVD process generally occurs at 2100° C. For MCVD soot and for very high concentrations of dopant, the vitrification temperature becomes so high that the external silica tube deforms itself during vitrification and collapse into an oval and useless preform.

Figure 2:
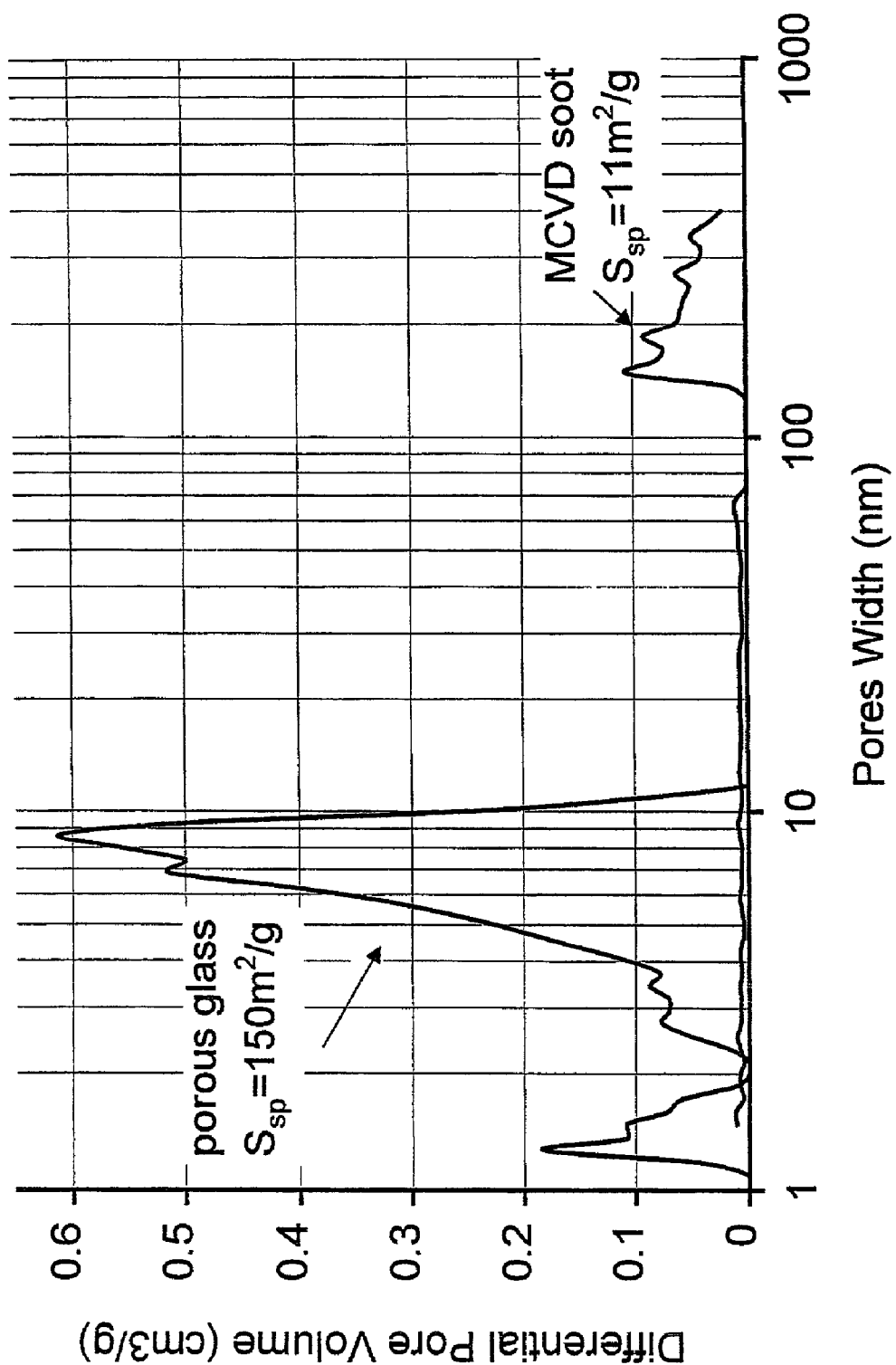
FIG. 2 is a graph showing the pore width versus differential pore volume for porous glass and MCVD soot.
Figure 3:
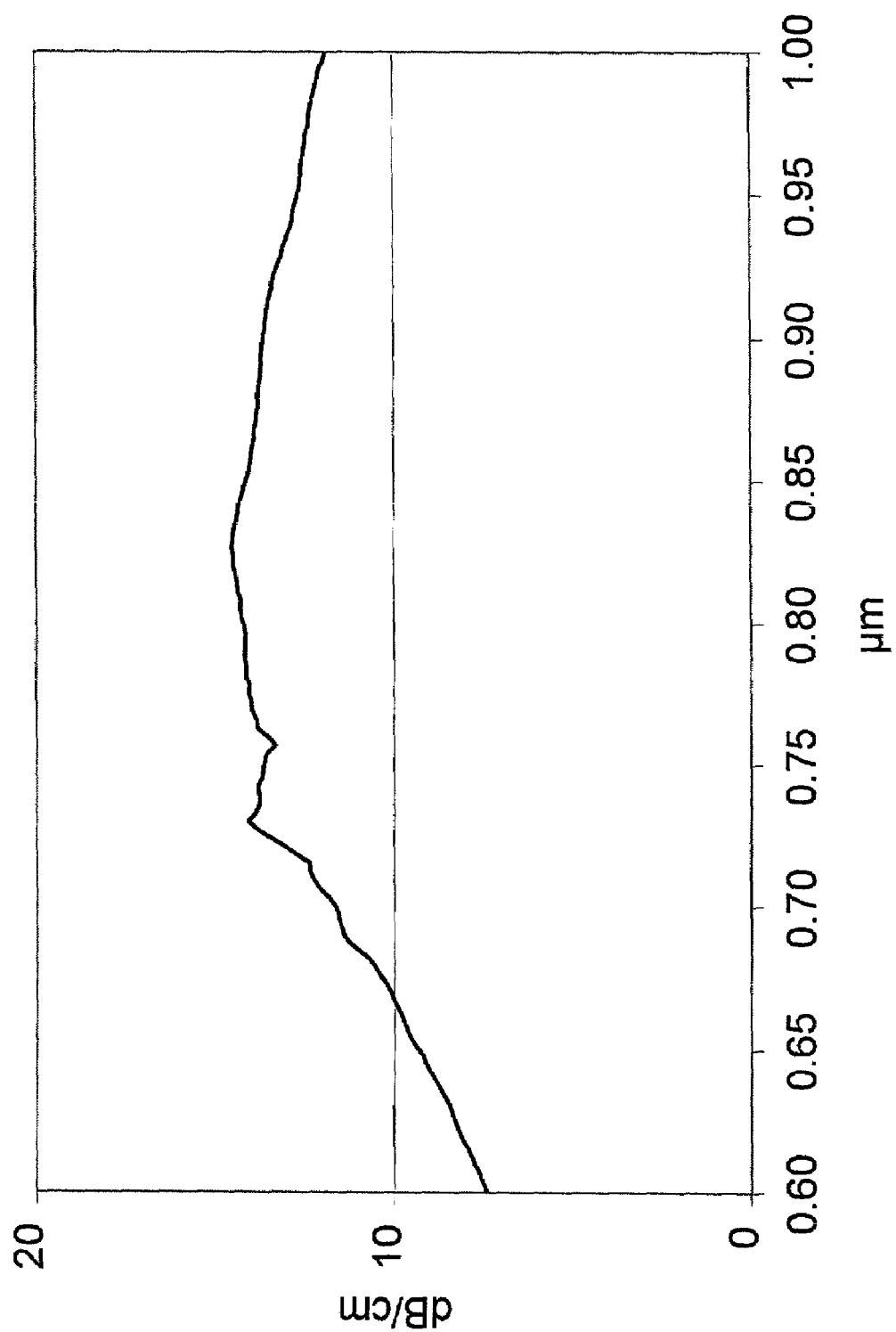
FIG. 3 is a graph showing the attenuation per cm of an optical fibre manufactured according to the present invention as a function of wavelength.

On the contrary, we have observed that under the same conditions of doping, the vitrification of porous glass occurs at much lower temperatures, i.e. 1200° C. It is believed that vitrification occurs at different temperatures because of the different surface characteristics of the materials involved. The MCVD soot is made of an aggregate of fine $SiO_2$ particles, and the porosity (or more exactly, its permeability) it exhibits comes from the space between the particles, so that the pores are much larger (macroporous). FIG. 2 is a graph of measurements of the specific surface and dimension of pores obtained by an analysis of the adsorption of gases of a non-vitrified soot produced by MCVD. A surface of 11 $m^2/g$ and pore sizes greater than 100 nm were measured. Similar measurements on Vycor® 7930 porous glass gave a surface of 150 $m^2/g$ and pore sizes less than 10 nm. The greater facility of porous glass to vitrify is attributed to the small size of its pores: a greater surface energy caused by smaller radii promotes closing of the pores. It is also believed that the concave surface of the holes of porous glass promotes their closing as opposed to the convex surface of the soot particles produced by CVD.

The principal object of the present invention is thus the production of preforms for monomode and multimode HAF fibres through doping of porous glass. The invention also extends to a method of fabrication of highly doped HAF fibres, since the method makes use of a low processing temperature. The invention also extends to the manufacture of active, doped fibres, such as fibres doped with erbium, as a decrease in the clustering in porous glass will increase the fluorescent power of these fibres.

As mentioned previously, porous glass for the purposes of the present invention is defined as glass which contains a plurality of interconnected micropores, excluding microparticular soot aggregates obtained by chemical vapor deposition (CVD).

Porous glass, as mentioned previously, is usually produced by a chemical attack on glass. They are generally based on borosilicate glass, but can be made from other types of glass, such as chalcogenide glasses, telluride glasses, or fluorozirconates. Although the present invention is not so limited, the following description will be based on using borosilicate glass.

It will be appreciated that for the purposes described in the present application, the porous glass should preferably be doped with at least two different dopants, one of which is transparent and serves to modify the index of refraction of the glass. In a preferred embodiment of the invention, aluminium is used to increase the index of refraction, but other dopants such as sodium, or cesium, or any other dopant which can increase the index of refraction of glass. On the other hand, in order to decrease the index of refraction, dopants such as ammonium fluoride can be used.

The second dopant is an inorganic compound which absorbs light, such as carbon or an oxide of transition metals like nickel, copper, cobalt, or oxide of rare-earth elements like erbium. Rare-earth elements not only have the property of absorbing light, but also has the property or re-emitting it, and are especially useful in active fibres.

Additionally, to facilitate flame working, a third dopant can also be used, in order to modify the softening temperature of the glass, related to the glass transition temperature (Tg), and generally includes alkaline and alkaline-earth elements. This is useful as it facilitates the fusion of the fibre with standard telecommunications fibres.

It will also be appreciated that these two or three dopants, although used to affect principally one specific property, will also affect the other properties, to varying degrees.

It should also be noted that hydroxyl groups (—OH) are present in porous glass preforms. These groups absorb light and they can be eliminated using a gaseous chlorine treatment at high temperature.

The method for fabricating preforms follows the following steps. Porous glass, either commercially obtained (for example from Corning, under the trademark Vycor® 7930), or manufactured using known techniques is the starting point.

If the porous glass is manufactured, the steps are generally the following. A rod of alkaliborosilicate is produced, having such a composition that a phase separation can be induced by heating it at a high temperature (but not too high so that the shape of the rod is conserved). After the phase separation, the structure of the glass is that of an almost pure silica matrix containing alkaline and boron oxide micro-phases in contact with each other. An acid or basic attack on the glass dissolves them, leaving a silica skeleton containing many small vessels in contact with each other (i.e. the interconnected micropores). The glass can be rinsed and dried, if so desired, and is then ready to be doped. It will also be noted that an advantageous alternative is to add, during the chemical attack or during rinsing, the dopants that are to be incorporated into the glass.

This last variation is a preferred one of the present invention, particularly for the manufacture of active fibres. It is believed that the doping performed at the same time as the chemical attack enables the introduction of the dopant directly into the silica structure, thereby further reducing the clustering of the dopant ions.

By adjusting the parameters of the concentration of the components of the glass, the temperature of the separation of phase, and of the temperature and concentration of the chemical attack solutions, the quantity and dimension of the pores, as well as its tendency to crack, can be controlled. Pore dimension can also be enlarged by chemical etching.

The choice of the dopant is dictated by the optical properties that its oxide gives glass, as well as by its chemical properties, such as its solubility, fusion point and ease of oxidation. In fact, in the large majority of cases, the dopant must undergo an oxidation reaction once it is incorporated in the porous glass. An example of a dopant is $Al(NO_3)_3.9H_2O$, which is more appropriate that $AlCl_3.6H_2O$. The former melts at approximately 100–120° C. without losing water molecules, which the latter does. Consequently, porous glass can be doped directly into the nitrate in fusion. Furthermore, the nitrate decomposes itself in $Al2O3$ at a temperature lower than 500° C., whereas $AlCl_3$, once it is dehydrated, starts to decompose itself at approximately 200° C., i.e. before oxidation, which renders the concentration of aluminium in the glass difficult to reproduce. Additionally, an oxygen source must be used to oxidize the $AlCl_3$. Thus, nitrates are generally more appropriate since they have their own built-in oxygen source (they decompose themselves into oxides and gaseous $NO_2$).

The doping of the porous glass with the desired chemicals is generally accomplished in a solution. Usually, the solvent is water, but other solvents can be used.

The doping can be effected using a wet porous glass (i.e. one which already contains water or a solution) for example by using freshly made porous glass exiting from the rinsing solution, or by using a dry porous glass. If using a dry porous glass, the doping is usually much quicker since the solution is sucked into the pores. If using a wet porous glass, the doping proceeds by molecular diffusion, which is slower. Although both methods can be used with equal efficiency, other than processing time, it is suspected that for two successive dopings, the fact that the preform is wet or dry may possibly have an impact on the final product.

Once the doping is completed, the glass is rinsed, dried for a period ranging from a few hours to a few days, at ambient temperature or higher (but less than 100° C.). Depending on the quantity of water present in the porous glass, it may be subject to craze, and this drying step must be carefully controlled.

Once the maximum amount of water is removed from the glass, it is heated in a closed oven, at the temperature of decomposition into an oxide of the dopant. This is done in a dry atmosphere, nitrogen if the dopant is a nitrate, or a mixture of nitrogen and oxygen if the product cannot spontaneously oxidise itself.

For nitrates, the oxidation is easy to follow by observing the $NO_2$ emanations, since this gas is brown. This gas must however be evacuated from the area, given its toxicity.

The oxidation can take place at temperatures as low as 200° C., but usually takes place between 500–600° C., since the processing time is shorter.

Once this step is completed, the glass is still porous. It can then be vitrified immediately, or doped a second time. In fact, as double or triple doping may be necessary if, for example, the dopant concentration is not high enough. This is due to the fact that the maximum concentration which can be obtained in a single doping is, for a given porosity of the glass, limited by the solubility of the starting compound in the dopant solution. Another reason for doubly or triply doping the glass can result from the desire to introduce many dopants in the glass which are incompatible with each other. For example, a solution containing such two products can be impossible because they precipitate each other. Consequently, a first doping and oxidation must be followed by a second doping and oxidation. One will note that this is generally possible only if the oxide is not soluble in the doping solution, which is generally the case.

If the hydroxyl chemical functions are to be removed from the glass, the glass is treated with chlorine at this point.

The last step consists in heating the glass at a very high temperature, preferably between 1000–1250° C., to cause the pores to collapse and thus insure the vitrification of the glass, to form reconstructed glass. It should be noted that if the hydroxyl compounds have not been removed, the vitrification must take place in a vacuum; otherwise the glass will have a tendency to form bubbles during further flame working.

It will be recalled that the index of refraction of the glass can be lowered by adding fluoridated compounds such as $NH_4HF_2$ to the doping solution. It thus is possible to manufacture reconstructed glass tubes having an index of refraction lower than the index of refraction of silica, in order to form doubly-clad fibres.

Once the vitrification process is complete, the glass can be integrated into a preform for the manufacture of optical fibres. There are a variety of ways of doing so, three of which are outlined herein.

First, a porous glass rod is homogeneously doped. Once the reconstructed glass is obtained, as above, a silica tube can be collapsed around it, which will form the cladding of the eventual optical fibre. The resulting preform, having a step index profile, can be stretched directly into an optical fibre. In this first case, two types of glass for the tube can be used. An ultra-pure silica tube, similar to those obtained by MCVD, or a reconstructed tube, doped or not, can be used. The use of a reconstructed tube can be advantageous if one wants to obtain a high numerical aperture for the resulting optical fibre. The index of refraction of reconstructed glass, naturally lower than silica, can be further lowered by doping it with a fluoridated compound. However, if one wants a reconstructed glass with a higher index of refraction, close to that of silica, the B2O3 present in the reconstructed glass can be removed by treating it with water vapour at a temperature of approximately 900° C. This last method has the advantage of eliminating approximately 90% of the hydroxyl groups in the glass. The use of reconstructed glass tube for the cladding can also be necessary if one wants to introduce absorbing compounds in the cladding. Finally, reconstructed glass tubes can be used for the manufacture of doubly clad fibres, as mentioned previously.

Second, the concentration of the dopants can be modulated in a porous glass rod. One thus obtains fibres having a gradient index, or gradient absorption, or a combination of both gradients. For example, a radial, parabolic modulation of the absorption in a HAF fibre can be necessary if the difference of losses between the guided modes in the fibre are to be minimized, even if the fibre is of the step index type. By successively doping the glass, absorption and index of refraction profiles which are independent from each other can be obtained.

A simple technique for modulating the concentration of the dopants consists in performing a first doping with the desired compounds, drying and oxidizing the dopants, and then performing a partial doping with another dopant, such as $NH_4F$ for lowering the index of refraction. A partial doping can be performed by placing the porous glass in the solution for a short period of time and by removing the porous glass from the solution before the solution has had a chance to penetrate to the centre of the glass, so that only the periphery of the glass is doped. If the dopant used is for lowering the index of refraction of the glass, the preform can be directly stretched into an optical fibre. The glass can also have a tube of silica or reconstructed glass collapsed around it.

Third, the porous glass is doped, dried, oxidized and vitrified as above, and then directly stretched into an optical fibre. This method is useful for manufacturing line terminator HAF fibres. It should be noted that such rods preferably should have an index of refraction equal to that of the injection fibre, in order to prevent any returned reflection into the optical fibre circuit.

An example of the fabrication of a doped optical fibre follows. It should be understood that times, temperatures, concentrations and chemical formulae of the dopants can all be adapted as a function of the desired product, and should not be considered limitative.

A rod of Vycor® 7930 porous glass is treated for 24 hours at 500° C. in order to eliminate any organic contamination.

In parallel, 14.267 g of $Al(NO_3)_3.9H_2O$ are mixed with 0.410 g of $Cu(NO_3)_2.2\frac{1}{2}H_2O$ and placed in a test tube. The test tube is placed in an oil bath heated to 125° C., in order to melt the mixture. The rod of porous glass is then submerged in the hot solution for approximately 16 hours. The rod is then removed from the solution, rinsed under water for approximately 30 seconds, and dried several days in a desiccator.

The doped rod is then transferred to a tubular oven, whose temperature is increased over a period of 12 hours to 300° C. This temperature is kept for 12 further hours, and then the temperature of the oven is increased over 15 hours to 500° C., where it is kept for 24 hours. This step transforms the nitrates of the dopants into their respective oxides.

The oven is allowed to cool down to ambient temperature, and the rod is then transferred into a hermetic silica tube and the air is removed. The tube is placed in an oven which is, over two hours heated to 625° C., and then over four hours to 950° C., where it remains for 17 hours, in order to eliminate water present in the porous glass in the form of hydroxyl compounds. The oven is then heated in 1.5 hours to 1150° C., in order to vitrify the glass. The rod remains in the hot oven for two hours. The now vitrified rod is removed from the oven, a silica tube is collapsed around it to make the preform which can be stretched into an attenuating fibre operating in the vicinity of 850 nm.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A preform for a high attenuation optical fiber comprising a core and a cladding, where said core is obtained from a vitrified rod of porous glass including a plurality of micro-pores obtained by phase separation doped with at least one dopant for absorbing light, wherein the optical fiber has an attenuation of at least 10 dB/cm.

2. A preform according to claim 1, wherein said porous glass is further doped with at least one dopant for changing the index of refraction of said glass or for changing the melting point of said glass.

3. A preform according to claim 1, wherein said cladding is obtained from a vitrified tube of porous glass doped with at least one dopant for absorbing light.

4. A preform according to claim 3, wherein said porous glass of said cladding is further doped with at least one dopant for changing the index of refraction of said porous glass of said cladding or for changing the softening point of said glass of said cladding.

5. A preform according to claim 2, wherein the concentration of at least one of said at least one dopant is modulated radially.

6. A preform according to claim 5, wherein said porous glass of said core is further doped with at least one dopant for changing the index of refraction of said glass or for changing the softening point of said glass.

7. A preform according to claim 6, wherein the concentration of at least one of said at least one dopant is modulated radially.

8. A high attenuation optical fiber comprising a core and a cladding, where said core is obtained from a vitrified rod of porous glass including a plurality of micro-pores obtained by phase separation doped with at least one dopant for absorbing light, wherein the optical fiber has an attenuation of at least 10 dB/cm.

9. A fiber according to claim 8, wherein said porous glass is further doped with at least one dopant for changing the index of refraction of said glass or for changing the softening point of said glass.

10. A fiber according to claim 8, wherein said cladding is obtained from a vitrified tube of porous glass doped with at least one dopant for absorbing light.

11. A fiber according to claim 10, wherein said porous glass of said cladding is further doped with at least one dopant for changing the index of refraction of said porous glass of said cladding or for changing the softening point of said glass of said cladding.

12. A fiber according to claim 9, wherein the concentration of at least one of said at least one dopant is modulated radially.

13. A method for making a preform for a high attenuation optical fiber having an attenuation of at least 10 dB/cm, the method comprising:
(a) providing a rod of porous glass including a plurality of micro-pores obtained by phase separation;
(b) doping said porous glass with at least one light-absorbing dopant;
(c) vitrifying said porous glass; and
(d) collapsing a tube of glass about said vitrified porous glass.

14. A method according to claim 13, wherein said step (b) includes the sub-steps:
(b1) placing said porous glass in a solution containing said at least one dopant; and
(b2) heating said porous glass to oxidize said solution.

15. A method according to claim 13, wherein said step (b) comprises doping said porous glass with one dopant, and said method further includes step (b3) doping said porous glass with another dopant.

16. A method according to claim 13, wherein said method further includes step (b9) removing from said porous glass hydroxyl groups.

17. A method according to claim 13, wherein said step (d) includes collapsing a tube made of porous glass doped with at least one dopant and subsequently vitrified.

18. A method for making a preform for a high attenuation fiber having an attenuation of at least 10dB/cm and comprising a core and a cladding, the method comprising:
(a) providing a tube of borosilicate;
(b) chemically etching said tube with a solution to render the silica porous, including a plurality of micro-pores obtained by phase separation;
(c) doping the resulting porous glass with at least one dopant for absorbing light;
(d) vitrifying said porous glass; and
(e) collapsing a tube of glass about said vitrified porous glass;

wherein steps (b) and (c) are performed simultaneously.

* * * * *